US008261290B2

(12) United States Patent
McCollum

(10) Patent No.: US 8,261,290 B2
(45) Date of Patent: Sep. 4, 2012

(54) HEARTBEAT SUBSCRIPTIONS

(75) Inventor: Raymond W. McCollum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1704 days.

(21) Appl. No.: 11/322,620

(22) Filed: Dec. 30, 2005

(65) Prior Publication Data

US 2007/0156870 A1    Jul. 5, 2007

(51) Int. Cl.
*G06F 13/14* (2006.01)
(52) U.S. Cl. .................... 719/320; 719/318; 709/205
(58) Field of Classification Search .................... 719/320
See application file for complete search history.

(56) References Cited

U.S. PATENT DOCUMENTS

| | | | |
|---|---|---|---|
| 2003/0046395 A1* | 3/2003 | Fleming et al. | 709/226 |
| 2004/0250283 A1* | 12/2004 | Duigenan et al. | 725/60 |
| 2005/0283477 A1* | 12/2005 | Donovan et al. | 707/8 |

OTHER PUBLICATIONS

Jan Alexander, et al., "Web Service Transfer (WS-Transfer)," BEA Systems, et al., Sep. 2004.
Jan Alexander, et al., "Web Service Enumeration (WS-Enumeration)," BEA Systems, et al., Sep. 2004.
J. Brezak, "HHTP Authentication: SPNEGO Access Authentication as Implemented in Microsoft Windows 2000," Microsoft, Kerberos Working Group, Internet Draft.
Akhil Arora, Web Services for Management (WS-Management Jun. 2005), Advanced Micro Devices, Inc., et al.
Graham, et al., "Publish-Subscribe Notification for Web Services," Akamai Technologies, et al., Version 1.0, Mar. 5, 2004.
Box, et al., "Web Services Eventing (WS-Eventing)," BEA Systems, et al., Aug. 2004.

* cited by examiner

*Primary Examiner* — S. Sough
*Assistant Examiner* — Syed Roni
(74) *Attorney, Agent, or Firm* — Workman Nydegger

(57) ABSTRACT

Example embodiments provide for "heartbeat" subscriptions which can be thought of as pseudo-events that can occur periodically for any subscription. Notification of a heartbeat event can be sent in lieu of, or in addition to, regular events to inform the subscriber application of such things like the subscription is still active and/or that connectivity exists between the subscriber application and the publishing service application. Alternatively, if the heartbeat notification does not arrive at the subscriber application, then the client knows that the connectivity is bad or that the subscription has expired and it may take corrective action (e.g., attempt to re-subscribe to the appropriate subscription). Note that similar embodiments also apply to pull requests received by the publishing service from the subscriber.

18 Claims, 2 Drawing Sheets

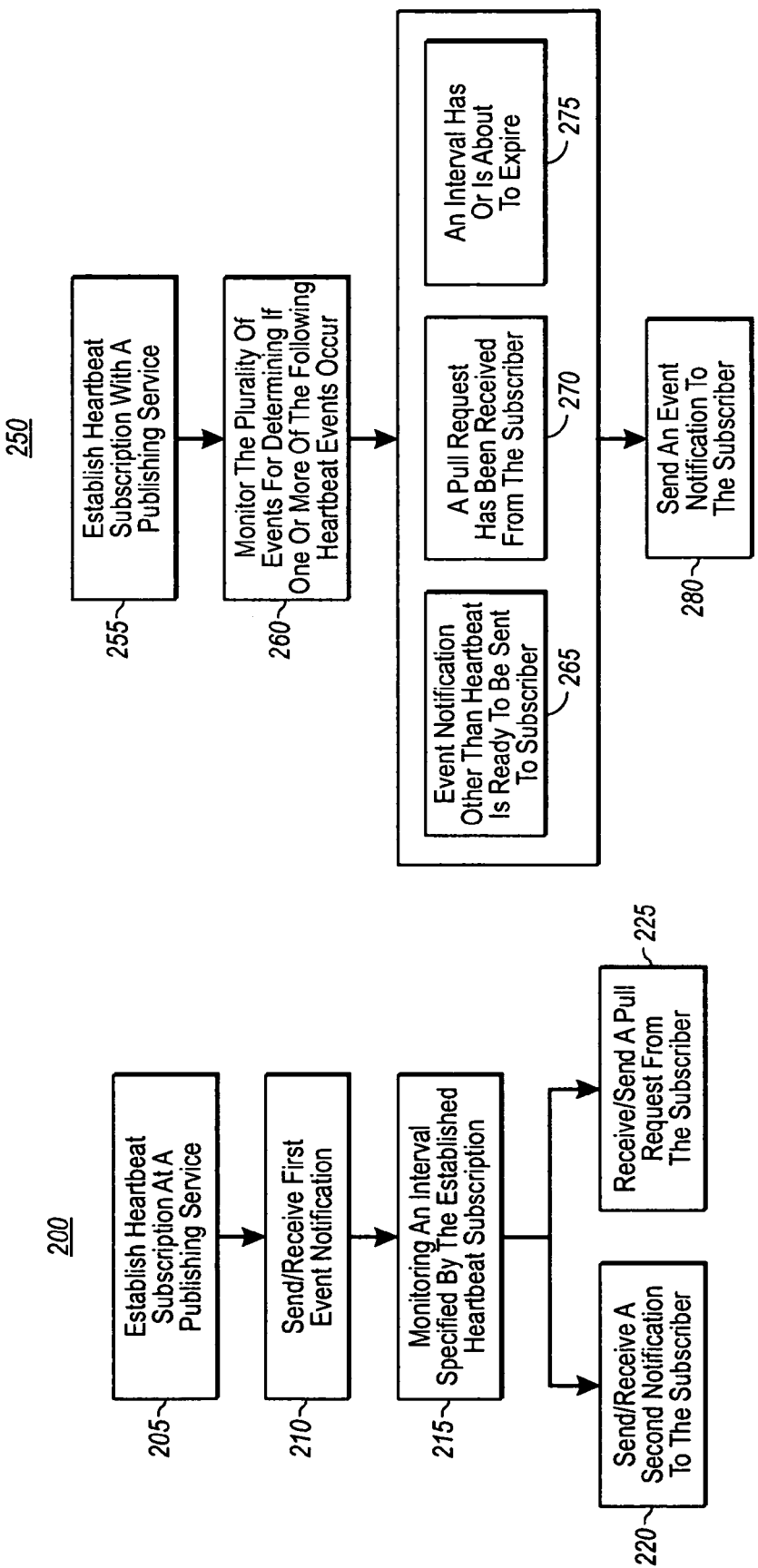

HEARTBEAT SUBSCRIPTIONS

CROSS-REFERENCE TO RELATED APPLICATIONS

N/A

BACKGROUND

Computerized systems provide many advantages towards peoples' ability to perform tasks. Indeed, the computer systems ability to process information has transformed the way we live and work. Computing systems now take a wide verity of forms including desktop computers, laptop computers, tablet PCs, Personal Digital Assistances (PDAs), and the like. Even household devices (such as refrigerators, ovens, sewing machines, security systems, and the like) have varying levels of processing capability, and thus may be computing systems. Processing capabilities continue to be incorporated into devices that traditionally did not have such processing power. Accordingly, the adversity trend of computing systems will likely increase.

Along with computing systems, the Internet has revolutionized the way people communicate and has ushered in a new era in human history often termed the "information age." In essence, the Internet includes a large constellation of networked computers that are spread out over much of the world. Sophisticated computers, software, and networking technology have made communication over the Internet fairly straight forward from the view point of the end user. In order to communicate over a network, typically one computing system constructs or otherwise accesses an electronic message and transmits the electronic message over a network to another computing system. Portions of the electronic message may be read by human users as when the electronic message is an email, instant message, an appointment, or the like. Alternatively, or in conjunction, the electronic message may be read by an application running on the receiving computing system. The electronic message may further be constructed by an application running on the sending computing system with the possible assistance of a human user.

When transferring an electronic message between computing systems, the electronic message will often pass through a protocol stack that performs operations on the data within the electronic message (e.g., parsing, routing, flow control, etc.). The Open System Interconnect (OSI) model is an example of a network framework for implementing a protocol stack. The OSI model breaks down the operations for transferring an electronic message into seven distinct layers, each designated to perform certain operations in the data transfer process. While protocol stacks can potentially implement each of the layers, many protocol stacks implement only selective layers for use in transferring data across a network.

When data is transmitted from a computing system, it originates at the application layer and is passed down to intermediate lower layers and then onto a network. When data is received from a network it enters the physical layer and is passed up to the higher intermediate layers and then is eventually received at that application layer. The application layer—the upper most layer—is responsible for supporting application and end-user processing. Further, within the application layer there may reside several other layers (e.g., the Simple Open Access Protocol (SOAP) layer). Another layer incorporated by most protocol stacks is the transport layer. An example of a transport layer is the Transmission Control Protocol (TCP).

In some environments, applications communicate with one another using the above OSI model and queued message communication. Queued communication includes mechanisms for a sending application to write a message into a sending queue, the sending queue to transfer the message to a receiving queue, and for a receiving application to read the message from the receiving queue. The queues maintain communication state outside of the communicating parties, and provide a level of abstraction between them. Accordingly, queued messaging provides reliable communication between loosely coupled applications. Senders and receivers of messages use intermediary queue managers to communicate, and may independently shut down and restart and may even have non-overlapping lifetimes. Queuing also allows clients and servers to send and receive messages "at their own pace" with the queue taking up the slack at either end.

One model of a queued messaging system is a published/subscribed (often termed pub-sub), which is an event driven architecture with the notions of subscriptions, events, and notifications. A subscription is a request made by a consumer or registrar (herein referred to as a "subscriber") to a data store or service (herein referred to as a "publishing service"), expressing interest in some change thereto (typically by specifying a scope and a criterion). Events, on the other hand, are actual changes that happen in the data server or service. When an event happens in a publishing service for which interest was expressed by a subscription, a notification is published and subsequently sent to a registrar or subscriber of that subscription notifying them of the event.

There are many examples of such pub-sub or other notification uses. For example, a user with online access that has previous booked or otherwise scheduled travel arrangements such as flight plans, hotel accommodations, car rentals, and meeting schedules may wish to be notified of any changes in his travel plans. Accordingly, a subscription can be developed that periodically polls one or more servers or services with knowledge of the user's travel plan events. Any changes identified may be reported to the registrar, which may then inform the user thereof.

Another example of where subscriptions are useful is in an email type environment where a user wishes to be notified of certain events and/or assigns an assistant to act on behalf of such events. For example, the user or an assistant may wish to know of events such as: when appointments have been scheduled and/or changed; the arrival of urgent email messages; when messages or folders have been created, deleted, updated, etc.; activities that happen on specific mailboxes; and other various events. Upon notification, the user or assistant may take action as appropriate.

Although pub-sub systems provide a convenient way of notifying users and/or assistants of events, existing implementations have no mechanism for determining if the subscription is active and/or if connectivity exists between the subscriber/registrar and the publishing service applications. As such, in the absence of received notifications, the subscriber or user will not know if there are no notifications to be received or if the system is otherwise inoperable. Although one solution may be to utilize the reliability mechanisms currently built into some of the underlying transport protocols (e.g., HTTPR (Reliable Hyper Text Transport Protocol), TCP/IP (Transmission Control Protocol/Internet Protocol), etc.), such implementation would still have several short comings.

For example, the subscriber (and possibly even the publishing service) would need dedicated code independent of the publishing service for communicating and ascertaining state from the lower communication layers. Accordingly, the needed code may not be within the skill set of a typical pub-sub developer and is also prone to human error. In addition, even if the subscriber (or even publishing service, as the case may be) is able to communicate with the lower layers of the transport, because these lower layers have no direct communication with the application layer, only connectivity across the various transport layers can be determined. Accordingly, the subscriber (and/or publishing service) would only know that the connection between the communication layers is active. The subscriber, however, would not know if the connection between the applications is alive and/or if the publishing service and/or subscription are active. As such, the problem remains that in the absence of notifications, the subscriber would not know if no notifications are available and/or if the publishing service is otherwise inoperable—due to such things as expiration of the subscription and/or fault from the publishing service.

BRIEF SUMMARY

The above-identified deficiencies and drawback of current event notification systems are overcome through example embodiments of the present invention. For example, embodiments described herein provide for maintaining, confirming, or otherwise determining an active subscription and connectivity between subscriber and publishing applications, without requiring dedicated code independent of the publishing service. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for maintaining or confirming connectivity and an act of subscription, without requiring dedicated code independent of the publishing service. Note that the following description for this embodiment will occasionally be described from both the perspective of the publishing service/subscriber respectively. In such embodiment, a heartbeat subscription can be established at a publishing service that notifies a subscriber of a plurality of events. A heartbeat event subscription periodically sends heartbeat event notifications to the subscriber regardless of whether or not other event notifications are available for sending. Depending upon the perspective noted above, a first event notification is sent to/or received by the subscriber. Upon sending/receiving the first event notification, an interval specified by the established heartbeat subscription is monitored. On or before the expiration of the interval, one of the following events occurs: (1) a second event notification is sent to/received by the subscriber for indicating that the publishing service application is operational and connectivity exists between the publishing service application and the subscriber application; and/or (2) a pull request is received by/sent to the publishing service requesting event notifications that have occurred since a previous pull request—indicating that connectivity exists between the subscriber application and the publishing service application.

Another embodiment also provides for determining connectivity and an active subscription, without requiring dedicated code independent of the publishing service. Similar to above, a heartbeat subscription is established with a publishing service that notifies a subscriber of a plurality of events. A heartbeat event subscription periodically sends heartbeat notifications to this subscriber regardless of whether or not event notifications are available for sending. Based on the heartbeat subscription, the events are monitored for determining if one or more of the following heartbeat events occurs: (1) An event notification other than a heartbeat notification is ready to be sent to the subscribers; (2) A pull request has been received from a subscriber requesting event notifications that have occurred since a previous pull request; and/or (3) an interval has or about to expire without sending an event notification has specified by the established heartbeat subscription. Based on the occurrence of these heartbeat events, an event notification is sent to the subscriber for indicating that the publishing service application is operational and connectivity exists between the publishing service application and the subscriber application.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A illustrates a flow diagram for maintaining/confirming connectivity and an active subscription using heartbeats in accordance with example embodiments; and FIG. 2B illustrates a flow diagram for determining connectivity and an active subscription without requiring dedicated code independent of the publishing service in accordance with example embodiments.

DETAILED DESCRIPTION

Figure 1:
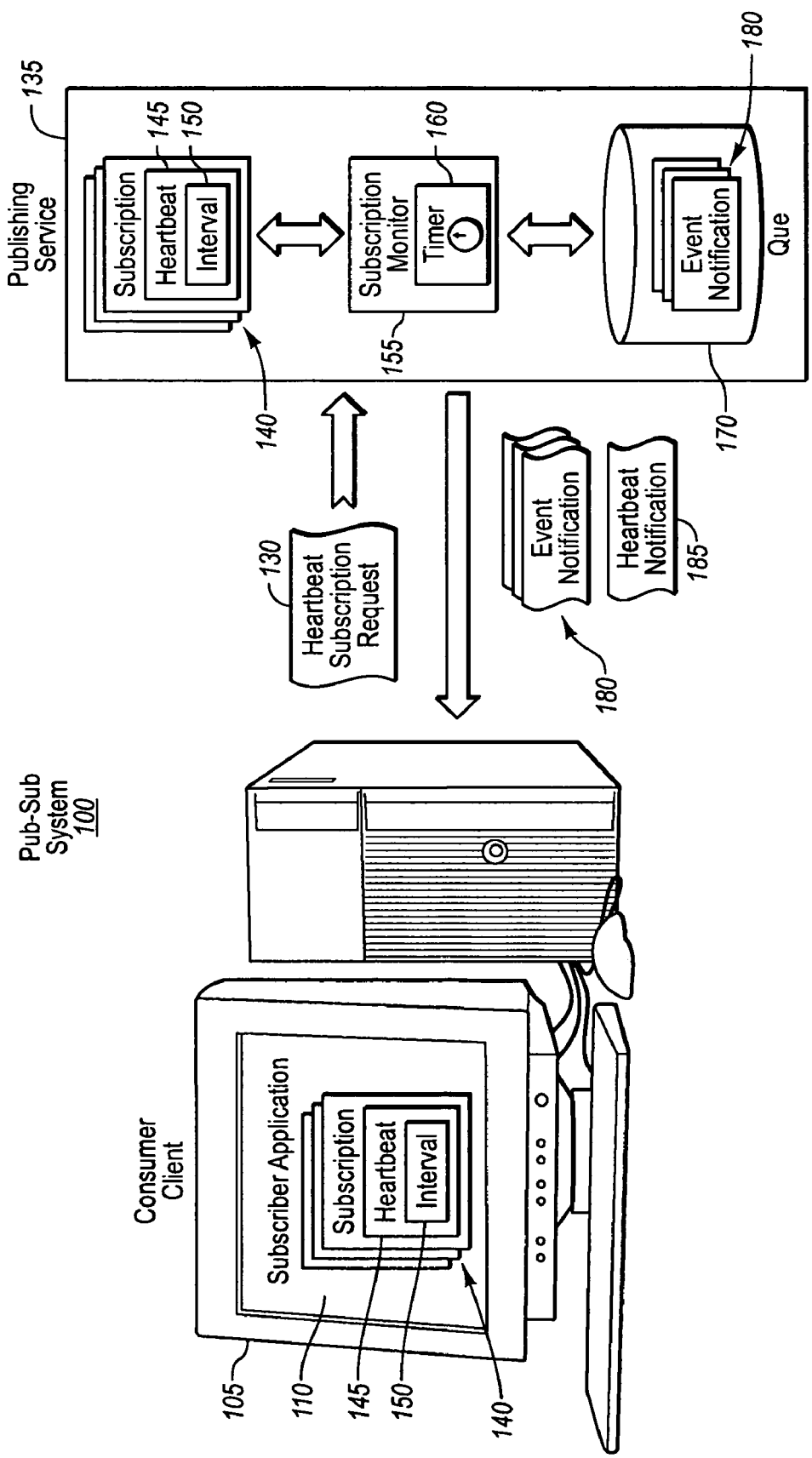
FIG. 1 illustrates a pub-sub system configured to establish a heartbeats subscription and send notifications thereto in accordance with example embodiments.

The present invention extends to methods, systems, and computer program products for maintaining/confirming/determining connectivity and an active subscription between a subscriber and publishing applications. The embodiments of the present invention may comprise a special purpose or general-purpose computer including various computer hardware or modules, as discussed in greater detail below.

As previously described, a typical problem with current event subscriptions is a situation in which no event traffic occurs. As such it may be difficult for a subscriber application to know whether: (1) no events matching the subscription have occurred; and/or (2) the subscription has failed due to such things as a bad connection, expired subscription, or failure of the overall publishing service.

Accordingly, example embodiments provide for "heartbeat" subscriptions which can be thought of as pseudo-events that can occur periodically for any subscription. Notification of a heartbeat event can be sent in lieu of, or in addition to, regular events to inform the subscriber application that the subscription is still active and that connectivity exists between the subscriber application and the publishing service application. Alternatively, if the heartbeat notification does not arrive at the client/subscriber application, then the client knows that the connectivity is bad or that the subscription has expired and it may take corrective action (e.g., attempt to re-subscribe to the appropriate subscription).

Note that the heartbeat subscriptions can also apply to "pull" mode deliveries as well in that they are a hint to the publishing service about how often to expect a pull request. In the event that the subscriber/client does not regularly call back at the heartbeat interval, the service may refuse to deliver queued event notifications. Alternatively, if no events are available at the heartbeat interval, the service may simply include a heartbeat notification or event as a result of the pull request.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1 illustrates a pub-sub system 100 configured to allow a consumer to subscribe to heartbeat notifications in accordance with example embodiments. As shown, client 105 is configured with a subscriber application 110 that can monitor various subscriptions 140 established with publishing service 135. Note that the subscriptions 140 may include any number of real events for which the consumer client 105 has interest. For example, the subscriptions 105 may notify the subscriber 110 or consumer client 105 of events relating to disk space, email notifications, web services, or any other well known event for which event notification 180 is desired.

For each subscription 140, a heartbeat subscription 145 can also be established for ensuring such things as: (1) connectivity between the subscriber application 110 and the publishing service 135; active subscriptions 140; and/or the publishing service 135 is operational. Accordingly, publishing service 135 may receive a heartbeat subscription request 130 and attach such to any subscription 140 for which the subscriber application 110 has shown interest. Note that all of the messages provided herein may be XML formatted messages such as SOAP; however, other similar messages are also contemplated herein.

Notice that heartbeat subscription 145 can be established for any number of subscriptions 140 as desired. Accordingly, one embodiment allows for a single heartbeat subscription request 130 to establish multiple heartbeat subscription 145 for any number of specified subscriptions 140. As such, as user may be given an option to select those subscriptions the heartbeat request 130 should apply. In such instance, a user interface may be provided that allows the user to select (using for example a check box) those subscriptions for which the heartbeat subscription 145 should be established.

Alternatively, the publishing service 135 may apply or establish the heartbeat subscription 140 using default settings. For example, the default settings may apply the heartbeat 140 to a single subscription or to multiple subscriptions, depending on the default settings. Of course, other default settings and other mechanisms for establishing the heartbeat 140 subscriptions are also contemplated herein.

Note also that the heartbeat subscription 145 may even be requested 130 within the request for another subscription 140 or in the reestablishment of a subscription 140, as described below. Accordingly, a field may be included within the request (e.g., a SOAP message) for a subscription 140 similar to the XML field below.

---

```
<wse:Delivery>
   ...
   <wsman:Heartbeat> xs:interval </wsman:Heartbeat>
   ...
</wse:Delivery>
```
---

Notice that the heartbeat notification 185 is typically an event message with no body and may be identified by its action URI (Uniform Resource Identifier). Further note that name "wse" identifies the field as an event request (e.g., web services eventing) and the "wsman:Heartbeat" name and namespace is used to both request the heartbeat 145 and specify the interval. Other embodiments, however, allow for the interval to be specified by the publishing service 135, or otherwise predefined as a default value when excluded from the request 130. Also note that the above names and namespaces are used for illustrative purposes only as any syntax may be used for identifying the heartbeat request 130 as appropriate.

Regardless of the number of subscriptions or how the heartbeat is established, each heartbeat 145 will include an interval 150 that will define a time period for performing various events and notifications as described in greater detail below. A subscription monitor 155 is also shown at the publishing service 135, which monitors the various subscriptions 140 for determining when event notifications 180 should be queued 170 for subsequent delivery to the subscriber application 110. Note that the event notifications 180 may be batched such that a plurality of event notifications 180 can be sent to the consumer client 110. As will be described in greater detail below, however, heartbeat notification 185 will typically not be included within such batch notifications, unless they are sent/received as the only notification within a batch.

In any event, the subscription monitor 155 has included therein a timer 160 which will monitor the various subscriptions 140 in accordance with the interval 150 defined within the heartbeat subscriptions 145. This interval 150 indicates one of a number of various events which should occur within or before a predetermined period. For example, the interval may specify when a pull request from the consumer/client 105 is expected. In this embodiment, if no event notifications 180 are queued 170 for delivery to the consumer client/subscriber application 110, then the publishing service 135 can send a heartbeat notification 185 in lieu of these event notifications 180. Note that the pull request sent from the subscriber application 110 indicates that connectivity exists between the consumer client 105 and the publishing service 135. Whereas, the heartbeat notification 185 returned to the subscriber application 110 indicates: (1) that connectivity exists between the publishing service 135 and the subscriber application 100; and/or (2) that the subscription 140 associated with the corresponding heartbeat 145 is still active.

Also note that in the instance of a pull from the client 105, the subscription application 110 will typically also include a corresponding heartbeat 145 and timer (not shown) that also monitors the interval 150 for sending such pull request. At or before the expiration of the time interval 150, the subscriber application as described above will send a pull request to the publishing service 135. If no notification (either a particular event notification 180 or heartbeat notification 185) is received after sending the pull, this subscriber 110 can assume that either: (1) no connectivity exists between the publishing service 135 and the subscriber application 110; and/or (2) that the publishing service 135 is otherwise in operable. In such an event, the subscriber 110 can take the appropriate corrective action, for example, re-subscribe to the subscription 140, attempt to reconnect to the publishing service 135, or other corrective/appropriate action.

On the publishing service 135 if the client 105 has not regularly called back within the heartbeat interval 150 (i.e., no pull is received from the consumer client 105), the service may refuse to deliver events. On the other hand, as previously described, if the pull is received and no event notifications 180 are queued to be sent to the client 105, the subscription monitor 155 or publishing service 135 can send the heartbeat notification 185 in lieu of such event notifications 180. Note, however, that if event notifications 180 are queued 170 to be sent to the consumer client 105, the event notifications may be sent 180 to the subscriber 110 wherein the timer 160 may be reset.

In an alternative embodiment, however, heartbeat notifications 185 may be automatically sent, regardless of whether event notifications 180 are queued for sending at the expiration of the predetermined interval. In other words, whenever a pull is received within the specified interval 150 the heartbeat notifications 185 are regularly sent regardless of whether event notification 180 are queued or have previously been sent. As will be described in regards to other embodiments below, this embodiment of regularly sending heartbeat notifications 185 at the specified interval 150 regardless of the occurrence of other events can also be applied to situations without the pull requests.

Note that in the above embodiment, the heartbeat notification 185 should typically not be batched within an event notification 180; rather it should be sent as an individual notification 185. In other words, the heartbeat event will usually not be intermixed with real events; but in the event that it is included in a batch notification, it will typically be the only event within such batch. Nevertheless, embodiments also allow for the event notification 180 to be intermixed with other notifications 185 provided the event notification 180 is distinguished from other events 185 within the batch.

As mentioned above, embodiments also apply to modes where the consumer client 105 does not pull the publishing service 135 for events, but rather waits for event notifications 180 to automatically be received from the publishing service 135. Similar to the pull mode described above, the subscription monitor 155 monitors an interval 150 for the heartbeat 145 within the various subscription 140 for determining the periodicity at which heartbeat notifications 185 should be sent to the consumer client 105. Similarly, on client 105, the subscriber application 110 monitors the heartbeat 145 timer (not shown) expecting to receive either event 180 or heartbeat 185 notifications on or before the expiration of the interval 150.

Also similar to the pull mode described above, the heartbeat event 185 may be sent in place of real event notifications 180 that would have occurred; however, it should typically not be intermixed with real events. Further, a heartbeat notification 185 can be sent as a batch notification, but typically it will be the only notification within such batch. Moreover, if event notifications 180 are queued 170 at or before the interval 150 expires, the subscription monitor 155 may send them to the client and reset the timer 160 for which event notifications 180 or heartbeat notification 185 will be sent to the subscriber application 110.

Alternatively, as described above, the heartbeat notification 185 can be sent at the predetermined intervals 150 regardless of whether or not event notifications 180 are queued 170 and/or have subsequently been sent. In such event, the publishing service 135 may send out the heartbeats 185 at the predetermined intervals 150 in addition to the event notifications 180 in order to prevent colliding time windows and race conditions, but typically the heartbeat events 185 or notifications 180 should be sent separately (not batched with other event notifications 180).

In other words, the goal is that some kind of event traffic always occurs within the heartbeat interval 150 in order to ensure connectivity between the subscriber application 110 and the publishing service 135 as well as validate that the subscription 140 is still active. Note that the publishing service 135 may send out heartbeat notification 185 (and other events 180) earlier than the intervals 150 specified in the subscription heartbeat 145. Accordingly, the system may not fail if heartbeats 185 are not sent at the predefined intervals 150, provided that other event notifications 180, 185 have been sent to the subscriber application 110 before the expiration of the interval 150.

Typically, the publishing service 135 if conformant to embodiments herein will typically not send heartbeats 185 asynchronously to any event notifications 180 already in progress. In other words, the heartbeat notifications 185 should be delivered in sequence like other event notifications 180, although they are typically delivered alone as a single events notification or the only event notification in a batch.

As previously noted, the heartbeat events are based on a countdown timer 160 or interval 150. Accordingly, if no events occur a heartbeat 185 may be sent out alone. Every time a real event 180 is delivered, however, in one embodiment the heartbeat countdown timer 160 is typically reset. As such, if a steady stream of real events 180 occurs, heartbeats 185 may never be delivered. In any event, note that heartbeats 185 will typically be acknowledged from the subscriber application 110 like most any other event 180.

If no heartbeats 185 are received at the subscriber 110 within the specified interval 150 or if no pull requests are received by the publishing service 135, the client 105/service 135 may assume that the subscription 140 is no longer active—i.e., either the publishing service 135 is inoperable, the subscription 140 has expired, or that there is no connectivity. In such instance, the publishing service 135 may proceed to cancel the subscription 140 and send a subscription end message, as the client 105 will likely re-subscribe. Upon receiving a subscription cancellation and/or otherwise identifying that the interval 150 has lapsed without receiving an event notification 180, 185, the client 105 may reconnect with the publishing service 135 and re-subscribe to the subscription and/or apply other corrective action as necessary.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIGS. 2A and 2B—is used to indicate the desired specific use of such terms.

As previously mentioned, FIGS. 2A and 2B illustrate flow diagrams for various example embodiments of the present invention. The following description of FIGS. 2A and 2B will occasionally refer to corresponding elements from FIG. 1. Although reference may be made to a specific element from FIG. 1, such references are used for illustrative purposes only and are not meant to limit or otherwise narrow the scope of the described embodiments unless explicitly claimed.

FIG. 2A illustrates a method 200 of maintaining/confirming connectivity and an active subscription, without requiring dedicated code independent of the publishing service in accordance of example embodiments. Note that the following description of method 200 will be described from the perspective of both the publishing service 135 and the client 105 simultaneously. Accordingly, the following description will refer to the action performed from the service 135 and client 105 by separating each action with a "/" and described it from the perspective of service 135/client 105, respectively. If the action does not separated by a "/", then it can be assumed to occur at either the service 135 or the client 105.

As shown in FIG. 2A, method 200 includes an act of establishing 205 a heartbeat subscription at a publishing service. For example, subscriber application 110 may send a heartbeat request 130 to the publishing service 135 for establishing a heartbeat subscription 145. In this embodiment, the heartbeat subscription 145 periodically sends heartbeat event notifications 185 to the subscriber 110 regardless of whether or not other event notifications 180 are available for sending. Note that the heartbeat request 130 may be sent as a request to establish a particular subscription 140 or it may be sent independently. Further, the heartbeat request 130 may apply to any number of subscriptions 140 the subscriber application 110 is a register thereof. Of course other mechanisms for establishing the heartbeat subscription 145 are also contemplated herein.

Method 200 also includes an act of sending/receiving 210 a first event notification. For example, publishing service 135 may send a first event notification, which is then received at that subscriber application 110. Note that such event notification may be a standard event notification 180 or as described herein may be a heartbeat notification 185.

Regardless of the type of notification sent/received, upon sending/receiving the first event notification, method 200 includes an act of monitoring 215 an interval specified by the established heartbeat subscription. For example, both consumer client 105 and/or subscription monitor 155 can monitor heartbeat interval 150. On or before expiration of the interval, method 200 further includes one of the following acts: an act of sending/receiving 220 a second notification to the subscriber; and/or an act of receiving/sending 220 a pull request from the subscriber.

For example, on or before the expiration of the interval 150, a publishing service 135 may send a second event notification that is received by the subscriber application 110 for indicating that the publishing service 135 application is operational and connectivity exists between the publishing service 135 and the subscriber application 110. Alternatively, or in addition, on or before the expiration of the interval 150, subscriber application 110 may send a pull request that is received by publishing service 135 requesting the event notifications 180 that have occurred since a previous pull request, thus indicating that connectivity exists between the subscriber application 110 and the publishing service 135.

In either case, the sending of the second heartbeat notification 180, 185, and/or the sending/receipt of the pull request may reset the interval 150 used in determining when the event notifications are to be sent to the subscriber 110 or for when a pull request is expected to be received from the subscriber 110. Note that the second event notification may be a real event notification 180 or a heartbeat notification 185. Further note that the request to establish the heartbeat subscription 145 may specify the interval 150 monitored.

Also note that after resetting the interval 150, if the interval may expire without either sending a third event notification 180, 185 to or receiving a pull request from the subscriber 110. In such embodiment, the following may occur: a subscription 140 corresponding to the heartbeat 145 is canceled; a subscription end notification is sent/received to the subscriber 110; and a request to re-subscribe to the subscription 140 and/or heartbeat subscription 145 is subsequently received/sent.

FIG. 2B illustrates a method 250 of determining connectivity and an active subscription without requiring dedicated code independent of the publishing service. Method 250 includes an act of establishing 255 a heartbeat subscription with the publishing service. For example, subscription application 110 may establish a heartbeat subscription 145 with the publishing service 135 that notifies a subscriber 110 of a plurality of events, wherein the heartbeat event subscription 145 periodically sends heartbeat event notifications 185 to the subscriber 110 regardless of whether or not one or more event notifications 180 from a plurality of events or subscriptions 140 are available for sending.

Based on the heartbeat subscription, method 250 further includes an act of monitoring 260 the plurality of events for determining if one or more of the following heartbeat events occur. First an event notification 265 other then heartbeat is ready to be sent to the subscriber. Second, a pull request 270 has been received from the subscriber. Third, an interval 275 has or is about to expire. Based on the occurrence of one or more of the above heartbeat events, method 250 further includes an act of sending 280 an event notification to the subscriber.

For example, publishing service 135 using subscription monitor 155 can monitor the plurality of events or subscriptions 140 for determining the following: that in event notification 180 other then the heartbeat notification 185 is ready to be sent to the subscriber 110; a pull request has been received at the publishing service 135 from the subscriber application 110, which indicates that the subscriber application 110 is operational and connectivity exists between the subscriber application 110 and publishing service 135; and/or an interval 150 has or is about to expire without sending an event notification 180, 185 as specified by the established heartbeat subscription 145. Based on the occurrence of one or more of these heartbeat events, the event notification 180, 185 may be sent to the subscriber 110 indicating that the publishing service 135 is operational and connectivity exists between such service 135 and the subscriber application 110.

Note that in the above embodiment, the event notification sent to the subscriber is a heartbeat notification 185 sent in lieu of another event notification 180. Also note that such heartbeat notification 185 may be an inquiry from the publishing service 135 as to whether or not the subscriber 110 is available, and wherein an acknowledgement response is subsequently received from the subscriber 110. Further note that in all the above embodiments, the heartbeat notification 185 may be a SOAP message with a header and no body.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a publishing service computer system, the publishing service computer system including a processor and system memory, the publishing service computer system configured to maintain subscriptions for and send event notifications to consumer computer systems that request notification of specified types of events that are of interest to the consumer computer systems, a method of confirming connectivity and an indication of an active subscription between the publishing computer system and a consumer computer system, the method comprising:

the publishing service computer system establishing plurality of subscriptions for a consumer computer system, each of the plurality of subscriptions for notifying the consumer computer system of specified events of interest to the consumer computer system;

the publishing service computer system receiving a heartbeat subscription request from the consumer computer system, the heartbeat subscription request requesting establishment of a heartbeat subscription for one or more of the plurality of subscriptions, the heartbeat subscription request indicating that the consumer computer system is interested in being notified of heartbeat events, heartbeat events signaling the consumer computer system that connectivity exists between the publishing service computer system and the consumer computer system;

the publishing service computer system establishing a multiple heartbeat subscription for the consumer computer system in response to receiving the heartbeat subscription request from the consumer computer system, the multiple heartbeat subscription specifying a time interval for monitoring the plurality of subscriptions, the multiple heartbeat subscription configured to send a heartbeat event notification to the consumer computer system when the time elapsed since sending the last event notification for any of the plurality of subscriptions at least equals the time interval;

sending a first event notification to the consuming computer system, the first event notification corresponding to one of the plurality of subscriptions;

upon sending the first event notification, the processor initiating a timer to monitor the time interval to determine when the time interval expires;

detecting expiration of the time interval by detecting that the amount of time elapsed since sending the first event notification at least equals the time interval, expiration of the time interval indicative of a heartbeat event; and upon detecting expiration of the time interval, sending a heartbeat event notification to the consumer computer system to confirm that the publishing service computer system has an active subscription for the consumer computer system.

2. The method of claim 1, wherein the heartbeat event notification is sent in lieu of another event notification.

3. The method of claim 1, further comprising:

sending a prior event notification to the consumer computer system prior to sending the first event notification; and resetting the time interval in response to sending the first event notification.

4. The method of claim 1, wherein the consumer computer system polls the publishing service computer system for events at or before the expiration of the time interval, and wherein the publishing service computer system sends the heartbeat event notification sent in lieu of another event notification.

5. The method of claim 1, wherein a request to establish the heartbeat subscription specifies the time interval monitored.

6. The method of claim 1, wherein the time interval monitored is specified by the publishing service.

7. The method of claim 3, wherein the prior, first, or both, event notifications are batch event notifications that include a plurality of notifications sent based on the time interval specified by the established multiple heartbeat subscription.

8. The method of claim 7, wherein the either the prior or first event notification is a heartbeat event notification that is not sent as part of the batched event notifications.

9. The method of claim 8, wherein the heartbeat event notification is sent as the only event within a batch event notification.

10. The method as recited in claim 1, wherein receiving a heartbeat subscription request comprises receiving a heartbeat subscription request that includes user entered selections, entered at the consumer computer system, expressly indicating that the heartbeat subscription applies to the plurality of subscriptions.

11. At a subscriber computing system, the subscriber computer system including a processor and system memory, the subscriber computer system configured to subscribe with a publishing service for specified types of event notifications that are of interest to the subscriber computer system, a method of confirming connectivity and an indication of an active subscription between the publishing service and the subscriber computer system, without requiring dedicated code independent of the publishing service, the method comprising:

the subscribing computer system establishing a plurality of subscriptions with the publishing service, each of the plurality of subscriptions for notifying the consumer computer system of specified events of interest to the consumer computer system;

the subscribing computer system sending a heartbeat subscription request to the publishing system, the heartbeat subscription request requesting establishment of a heartbeat subscription for one or more of the plurality of subscriptions, the heartbeat subscription request indicating that the subscriber computer system is interested in being notified of heartbeat events, heartbeat events signaling the subscribing computer system that connectivity exists between the subscribing computer system and the publishing service;

the subscriber computer system receiving an indication of a multiple heartbeat subscription being established at the publishing service for the plurality of subscriptions, the multiple heartbeat event subscription specifying a time interval for monitoring the plurality of subscriptions, the multiple heartbeat subscription configured to send a heartbeat event notification to the subscriber computer system when the time elapsed since sending the last event notification for any of the plurality of subscriptions at least equals the time interval;

receiving a first event notification from the publishing service, the first event notification corresponding to one of the plurality of subscriptions; and upon receiving the first event notification, the processor initiating a timer to monitoring the time interval to determine if connectivity to the subscriber computer system is to be considered lost; and prior to detecting that the amount of time elapsed since receiving the first event notification at least equals the time interval, receiving a heartbeat event notification confirming that the publishing computer system has an active subscription for the consumer computer system and that connectivity exists between the publishing service and the subscriber computer system.

12. The method of claim 11, wherein the heartbeat event notification sent in lieu of another event notification.

13. The method of claim 12, wherein the first event notification received is also a heartbeat event notification.

14. The method of claim 12, wherein the heartbeat event notification is an inquiry from the publishing service as to whether or not the subscriber is available, and wherein an acknowledgement response is subsequently send to the publishing service.

15. The method of claim 11, wherein further comprising:
receiving a prior event notification from the publishing service prior to receiving the first event notification;
resetting the interval in response to receiving the first event notification.

16. The method as recited in claim 11, further comprising receiving user entered selections at the subscribing computer system, the user entered selections expressly indicating that the multiple heartbeat subscription applies to the plurality of subscriptions; and
wherein sending the heartbeat subscription request comprises sending a heartbeat subscription request that includes user entered selections so as to indicate to the publishing service that the heartbeat subscription applies to the plurality of subscriptions.

17. The method as recited in claim 16, wherein receiving user entered selections at the subscribing computer system comprises receiving check boxes selections through a user interface at the subscribing computer system.

18. A computer program product for use at a publishing service computer system, the publishing service computer system including a processor and system memory, the publishing service computer system configured to maintain subscriptions for and send event notifications to consumer computer systems that request notification of specified types of events that are of interest to the consumer computer systems, the computer program product for implementing a method of confirming connectivity and an indication of an active subscription between the publishing computer system and a consumer computer system, the computer program product comprising one or more computer storage media having stored thereon computer-executable instructions that, when executed at a processor, cause the publishing service computer system to perform the method, including the following:

establish plurality of subscriptions for a consumer computer system, each of the plurality of subscriptions for notifying the consumer computer system of specified events of interest to the consumer computer system;

receive a heartbeat subscription request from the consumer computer system, the heartbeat subscription request requesting establishment of a heartbeat subscription for one or more of the plurality of subscriptions, the heartbeat subscription request indicating that the consumer computer system is interested in being notified of heartbeat events, heartbeat events signaling the consumer computer system that connectivity exists between the publishing service computer system and the consumer computer system;

establish a multiple heartbeat subscription for the consumer computer system in response to receiving the heartbeat subscription request from the consumer computer system, the multiple heartbeat subscription specifying a time interval for monitoring the plurality of subscriptions, the multiple heartbeat subscription configured to send a heartbeat event notification to the consumer computer system when the time elapsed since sending the last event notification for any of the plurality of subscriptions at least equals the time interval;

send a first event notification to the consuming computer system, the first event notification corresponding to one of the plurality of subscriptions;

upon sending the first event notification, initiate a timer to monitor the time interval to determine when the time interval expires;

detect expiration of the time interval by detecting that the amount of time elapsed since sending the first event notification at least equals the time interval, expiration of the time interval indicative of a heartbeat event; and upon detecting expiration of the time interval, send a heartbeat event notification to the consumer computer system to confirm that the publishing service computer system has an active subscription for the consumer computer system.

* * * * *